United States Patent [19]
Arnold et al.

[11] Patent Number: 4,886,123
[45] Date of Patent: Dec. 12, 1989

[54] CONTROL DEVICE FOR POSITION-CONTROL OF IMPLEMENT COUPLED TO AN AGRICULTURAL VEHICLE

[75] Inventors: Winfried Arnold, Vaihingen/Enz; Horst Hesse, Stuttgart; Werner Schumacher, Asperg, all of Fed. Rep. of Germany

[73] Assignee: Robert Bosch GmbH, Stuttgart, Fed. Rep. of Germany

[21] Appl. No.: 143,213

[22] Filed: Jan. 7, 1988

Related U.S. Application Data

[63] Continuation of Ser. No. 875,015, Jun. 13, 1986, abandoned.

[30] Foreign Application Priority Data

Jun. 26, 1985 [DE] Fed. Rep. of Germany ....... 3522818

[51] Int. Cl.$^4$ ............................................ A01B 63/112
[52] U.S. Cl. ..................................... 172/7; 180/197; 364/424.07; 364/426.03
[58] Field of Search .............................. 172/2, 7, 9–12; 180/197; 364/424, 426

[56] References Cited

U.S. PATENT DOCUMENTS

| | | | |
|---|---|---|---|
| 3,776,322 | 12/1973 | Misch et al. | 172/2 |
| 3,834,481 | 9/1974 | Carlson | 172/7 |
| 4,053,018 | 10/1977 | Takeda | 172/7 |
| 4,075,538 | 2/1978 | Plunkett | 180/197 |
| 4,282,933 | 8/1981 | Suganami et al. | 172/7 |
| 4,423,785 | 1/1984 | Kurihara et al. | 172/7 |
| 4,454,919 | 6/1984 | Arnold et al. | 172/7 |
| 4,518,044 | 5/1985 | Wiegardt et al. | 172/7 |
| 4,571,500 | 2/1986 | Mucheyer | 172/7 |

OTHER PUBLICATIONS

Ismail, Singh and Gee-Clough, "A Preliminary Investigation of a Combined Slip and Draught Control For Tractors", J. Agric. Eng. Res (1981)26, 293–306.

Primary Examiner—Bruce M. Kisliuk
Attorney, Agent, or Firm—Michael J. Striker

[57] ABSTRACT

In a device for controlling a slip and a traction force of an implement coupled to a tractor by a hoisting unit, a slip contol system is combined with a traction force control system. The control device includes a drive speed sensor connected to the tractor and an acceleration sensor positioned on the tractor. A measured acceleration value is compared in a comparator circuit with an adjusted output signal of the drive speed sensor, and an actual slip value is determined by integration from an acceleration difference signal. The actual slip value is used for adjusting a control value generated in the traction force control system to control a position of the hoisting unit.

9 Claims, 1 Drawing Sheet

CONTROL DEVICE FOR POSITION-CONTROL OF IMPLEMENT COUPLED TO AN AGRICULTURAL VEHICLE

This application is a continuation of application Ser. No. 875,015, filed June 13, 1986 now abandoned.

BACKGROUND OF THE INVENTION

The present invention relates to a control device for a position-control of an implement coupled to a tractor by a hoisting unit.

A control device for controlling a position of an implement coupled to a tractor, of the type under consideration, has been known and disclosed, for example Ismail, Singh and Gee-Clough in "A Preliminary Investigation of a Combined Slip and Draught Control for Tractors", I. Agric, Engng, Res. (1981) 26, 293–306. In this known control device, a traction force or draught control system is combined with the slip control system on the tractor provided with a plow hinged thereto. It has been proposed for a slip control to measure a drive speed by a speed sensor on a driven rear wheel or in the drive and to also measure a travelling speed relative to the soil by a speed sensor on the non-driven front wheel of the tractor. This slip control has, however, the disadvantage that it is suitable only for the tractor in which not all the wheels are driven. In the tractors with the drive for all wheels the draught and slip control disclosed in the above mentioned publication is not expedient because an additional fifth wheel for determining an absolute speed is too expensive. It has been also proposed in the above publication that the travelling speed of the tractor relative to the ground be determined by a radar sensor and to thereby define the slip. Such radar sensors are rather expensive and require certain fitting positions in the device.

SUMMARY OF THE INVENTION

It is an object of the present invention to provide an improved control device for position-control of an implement coupled to a tractor by a hoisting unit.

It is another object of the invention to provide a control device for traction force and slip control in which a slip control is possible without expensive speed sensors.

It is yet another object of the present invention to provide a slip control device which would be suitable particularly for use with tractors having all wheels driven.

These and other objects of the invention are attained by a control device for position-control of an implement coupled to an agricultural vehicle by a hoisting unit, particularly of a plow coupled to a tractor, the control device comprising a device for determining a slip of the vehicle, said determining device including a first control circuit forming by comparison with a slip reference value a slip-control deviation value to affect the implement in a raised position; a second control circuit for processing an additional control value for a hoisting unit-control device, said second control circuit being combined with said first control circuit; a drive speed sensor detecting a greater drive speed of the vehicle as compared to a true travel speed; an acceleration sensor arranged on the vehicle for measuring the true acceleration thereof; a comparator device receiving signals from said drive speed sensor and said true acceleration sensor; and an adjusting device connected in series to one of said sensors and determining from an input signal a signal pattern adjusted to an output signal of the other of said sensors.

Due to the utilization of a relatively simple and inexpensive acceleration sensor on the tractor, large slip values which could damage the soil would be avoided, an impact force of the tractor would be increased due to small slip fluctuations, and a deadlock of the tractor would be prevented.

The adjusting device may be connected in series to said drive speed sensor and is formed as a differentiator for generating a differentiated acceleration signal, and the true—and differentiated acceleration signals are compared in said comparator circuit; and further including an integrator, and wherein a difference signal formed from said two acceleration signals is fed to said integrator for forming an actual slip value for said first control circuit. In such an embodiment, an error due to integration procedures accumulated over a period of time remains constant and can be relatively easily corrected.

In a modification, the adjusting device may be connected in series with said acceleration sensor and is formed as an integrator, wherein the true—and drive speed signals are compared in said comparator circuit and a difference signal formed from said two speed signals is used for forming an actual slip value for said first control circuit.

The comparator device, the adjusting device, and the first and second control circuits may be formed as an electronic system.

A bandpass filter may be connected to each input of the comparator circuit.

The acceleration sensor is a sensor operating independently from speed-dependent values of the vehicle, for example an inertia sensor.

The first control circuit is superimposed with the second control circuit.

The control device may further include an amplifying adjusting device connected to a summing point in the second control circuit, said slip-control deviation value being applied via said amplifying adjusting device to the summing point to which also a reference traction force value and an actual traction force value of said second control circuit is applied.

At least the first mentioned adjusting device and the comparator circuit may be realized on a common printed circuit board with a microprocessor.

All electrical components of the device may be carried out in analogous technique.

The novel features which are considered as characteristic for the invention are set forth in particular in the appended claims. The invention itself, however, both as to its contruction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
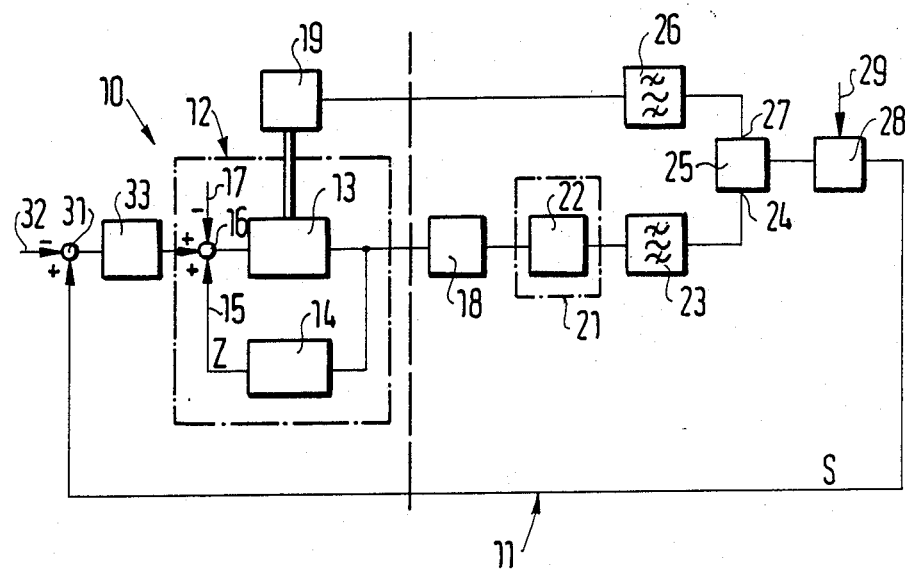
FIG. 1 is a simplified block circuit diagram of the control device for position control with a differentiating adjusting device.

FIG. 1 illustrates a diagram of a control device 10 for position control of an implement hinged to a tractor of an agricultural machine by a hoisting unit.

The control device 10 includes an outer first control circuit 11 for control of slip S. The first control circuit 11 is superposed by a second inner control circuit 12 in which a control value of a traction force Z is processed.

A tractor 13 with its hoisting unit, which is a vehicle of an agricultural machine is included in the inner second control circuit 12 as well as a plow 14 which is an operating device hinged to the tractor by a conventional three-point linkage. Plow 14 is vertically adjustable by an electro-hydraulic device relative to the ground. As a working resistance of the plow changes first of all in dependence upon the depth of the plow in the soil, forces are exerted on the tractor from the plow via the levers of the three-point linkage. These forces are measured and are fed back as a traction force actual value 15 to a summing point 16 to which, at the same time, a traction force-reference value 17 of an opposite polarity is applied. The first control circuit 11 for slip S superposes the known control circuit 12 for the traction force.

In order to determine a slip a speed sensor 18 and an acceleration sensor 19 are provided on the tractor 13. The speed or r.p.m. sensor 18 serves to determine a higher drive speed as compared with the traveling speed whereby the sensor is in cooperation with driven rear wheels of the tractor or with its transmission. The sensor has at its input an r.p.m. signal and issues at its output a speed signal which is proportional to the drive speed of tractor 13. The speed sensor 18 is connected in series with an adjusting device 21 which is formed as a differentiating circuit. This differentiating circuit forms from a given drive speed signal a derivative signal at its output, which signal corresponds to a derivative acceleration. This signal indicative of the derivative acceleration is processed through a bandpass filter 23 and is applied to a first input 24 of a comparator circuit 25.

The accelerator sensor 19 which is rigidly connected to the tractor 13, operates independently from r.p.m. of the driven or non-driven wheels of the tractor. Such acceleration sensors are relatively inexpensive on the market and can operate, for example on the inertia principle. The acceleration sensor 19 issues at its output an electrical signal, the value of which in conformity with a true traveling speed value of the tractor 13 relative to the soil corresponds to a true acceleration. This true acceleration signal is applied via a second bandpass filter 26 to a second input 27 of the comparator circuit 25.

The comparator circuit 25 determines from the derivative and true acceleration signals fed thereinto a differential acceleration signal and delivers this signal further to an integrator or rate meter 28 which integrates the differential acceleration signal into an actual slip value S. The integrator 28 is adjusted to null by a setting signal 29.

The actual value S of the slip is fed from the output of the integrator 28 back to a second summing point 31 to which a reference slip value 32 is additionally applied. The signal for a a control deviation of the slip produced at the output of summing point 31 is further processed through the adjusting device 33 for amplifying a slip deviation and is applied to the first mentioned summing point 16 where that signal is added to the actual value 15 of the traction force Z. The first control circuit 11 for the slip is thus overlapped with the traction force-control circuit 12.

The mode of operation of the control device 10 will be explained herein below whereas the function of the inner traction force-control circuit 12 is assumed as conventional.

For controlling a slip a drive speed is determined in the known manner by the speed sensor 18 which measures a number of revolutions in the transmission of tractor 13 or on the driven rear wheel and thus forms an output signal proportional to the drive speed. A drive acceleration value is then determined from the drive speed-proportional signal by differentiating in the adjusting device 21. The drive acceleration signal is then applied to input 24 of the comparator circuit 25. Additionally, the comparator circuit is supplied at its second input 27 with the measured value of acceleration from the acceleration sensor 19. The latter determines a true acceleration value independently from measurements r.p.m. in the tractor 13. The difference between the acceleration signals received at the input of integrator 28 results, by intergrating per time unit, in an output signal which corresponds to the difference between the speed of the drive and the true traveling speed and thus to the actual slip S.

This actual value signal indicative of the slip S is fed to the second summing point 31 and is compared therein with the reference value 32 for the slip. A resulting deviation value of the slip is processed via the amplifying adjusting device 33 and fed to the first summing point 16 where it is added to the actual value 15 of the traction force obtained in the circuit 12. The effect of the superimposition of the slip on the traction force control circuit 12 permits for adjustment of the signal with the adjusting device 33.

Due to the slip-superimposition a large slip which could destroy the soil is prevented. Furthermore, a percussion force of the tractor can be increased by small slip fluctuations and a dead-lock of the tractor would be prevented.

Both inputs of the comparator circuit 25 are connected to assigned bandpass filters 23 and 26 by means of which both signals indicative of acceleration are dynamically adjusted to each other. It is attained in this manner that with normal changes in the traveling speed the output signal in the comparator circuit 25 remains null; furthermore, small static signal deviations, such as for example, occuring while traveling in hills and valleys, and stationary null-point errors are not integrated by applying the setting signal 29 to the integrator. The output of the integrator must be set to null at the beginning of the furrowing process. This step can be coupled with the actuation of the sinking of the plow 14.

The control device 10 advantageously requires no expensive speed sensors for determining an absolute traveling speed but operates with an inexpensive acceleration sensor. The processing of the various signals from the acceleration sensor 19 and r.p.m. sensor 18 is carried out by electronic means without substantial expense. If the integration in the integrator 28 is performed incorrectly and a wrong slip value is determined, such an error remains constant and does not increase in time. Such constant errors can be easily compensated for by the driver of the tractor by a suitable readjustment of the reference value 17 of the traction force.

Figure 2:
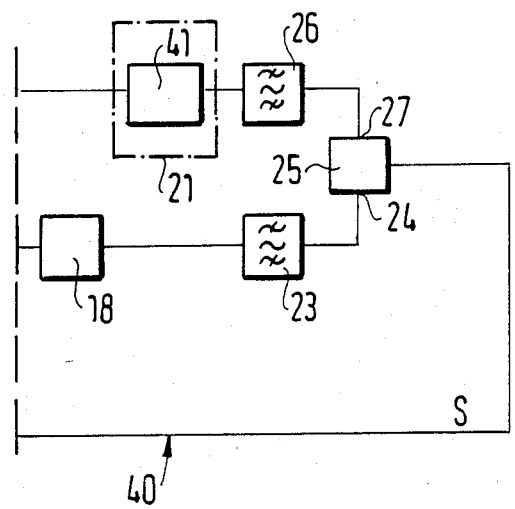
FIG. 2 is a part of the circuit diagram of the modified control device with an integrating adjusting device.

FIG. 2 illustrates a portion of the modified control device 40. Similar structural components are designated in FIG. 2 by the same reference numerals as those in FIG. 1.

The modified control device 40 differs from the control device 10 of FIG. 1 in that the adjusting device 21 is formed and connected in the device 40 differently. Moreover, the integrator 28 connected to the comparator circuit 28 is omitted.

In the modified control device 40, the adjusting device 21 itself is formed as an integrator and is interconnected between the true acceleration sensor 19 and the second bandpass filter 26.

The mode of operation of the control device 40 differs from the operation mode of control device 10 of FIG. 1 in that two speed-dependent signals are processed in the comparator circuit 25, and the actual value for the slip is formed immediately from those signals. For this purpose, a speed-dependent signal indicative of the drive speed of the tractor 13 is fed immediately from the r.p.m. sensor 18 to the first input 24 of the comparator circuit 25. Since the signal for a measured true acceleration issued by the acceleration sensor 19 can be added in the adjusting device 21 directly to the signal indicative of the speed, a comparison signal becomes available in the comparator circuit 25. When the integrator 41 in the control device 40 makes an error in the deviation during the determination of a slip increases in time and therefore in some time, a relatively large slip error occurs. Higher requirements to precision of the integrator circuit 41 must be set as compared to those of the control device 10. Also, a null point coordination is more difficult in the control device 40.

It is, of course, understood that other modifications of the control device are possible. Although the above described combination of the traction force with the slip control is particularly advantageous other control values, in place of the traction force, can be taken into consideration. Also, the manner of combining the both control circuits is not limited to the above described embodiments. The electrical components of the control device can be realized by analogous technique or digital teachnique. It is also possible to perform the necessary functions of determining a slip by intergrating, differentiating, filtering and comparing with the aid of microprocessors.

It will be understood that each of the elements described above, or two or more together, may also find a useful application in other types of control device for position-control of implements of agricultural machines differing from the types described above.

While the invention has been illustrated and described as embodied in a control device for position-control of an implement hinged to a tractor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A control device for position-control of an implement coupled to an agricultural vehicle by a hoisting unit, particularly of a plow coupled to a tractor, the control device comprising a first control circuit including a drive speed sensor for detecting a speed of a drive of the vehicle and generating a drive speed signal, a differentiating device for processing said drive speed signal into a derivative acceleration signal; a true acceleration sensor fixedly mounted on the vehicle to detect true acceleration thereof relative to the ground and generate a true acceleration signal, a comparator for comparing the derivative and the true acceleration signals and generating a differential acceleration signal, an integrating device for processing said differential acceleration signal into an actual slip value, and a first summing means for comparing said actual slip value with a slip reference value and generating a slip control value; a second control circuit including a second summing means for comparing an actual traction force value of the vehicle with a traction reference value and generating a position control value for said hoisting unit; and means for combining said slip control value from the first control circuit with the position control value of the second control circuit to affect via said hoisting unit the position of said implement.

2. The control device as defined in claim 1, wherein said first and second control circuits are formed as an electronic system.

3. The control device as defined in claim 2, wherein a bandpass filter is connected to each input of said comparator circuit.

4. The control device as defined in claim 2, wherein said acceleration sensor is a sensor operating independently from speed-dependent values of the vehicle.

5. The control device as defined in claim 4, wherein said acceleration sensor is formed as an inertia sensor.

6. The control device as defined in claim 2 wherein said combining means include an amplifying adjuster connected between an output of said first summing means and an input of said second summing circuit to add said slip control value to said actual traction force value.

7. A control device for position-control of an implement coupled to an agricultural vehicle by a hoisting unit, particularly of a plow coupled to a tractor, the control device comprising a first control circuit including a drive speed sensor for detecting a speed of a drive of the vehicle and generating a drive speed signal, a true acceleration sensor fixedly arranged on the vehicle for detecting the true acceleration thereof relative to the ground and generating a true acceleration signal, an integrating device for processing said true acceleration signal into a true speed dependent signal, a comparator for comparing the true speed dependent signal with the drive speed signal and generating an actual slip value, and a first summing means for comparing said actual slip value with a slip reference value and generating a slip control value; a second control circuit including a second summing means for comparing an actual traction force value of the vehicle with a traction reference value and generating a position control value for said hoisting unit; and means for combining said slip control value from the first control circuit with the position control value in the second control circuit to affect via said hoisting unit the position of said implement.

8. The control device as defined in claim 7, wherein said first and second control circuits are formed as an electronic system.

9. The control device as defined in claim 8 wherein a bandpress filter is connected to each input of said comparator.

* * * * *